Oct. 5, 1926.
P. D. THROPP ET AL
1,602,132
COLLAPSIBLE CORE AND CHUCK
Filed July 29, 1922
2 Sheets-Sheet 1
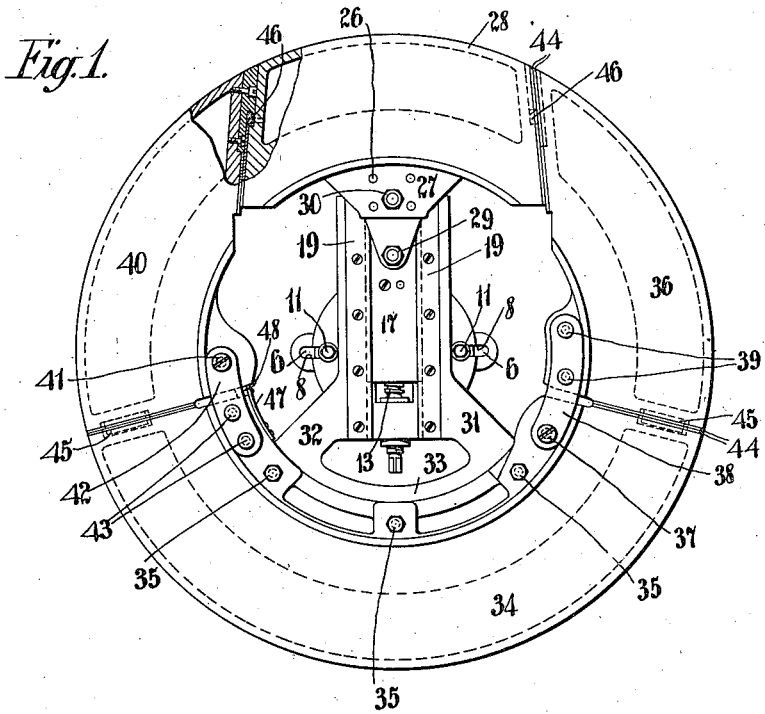
Fig.1.
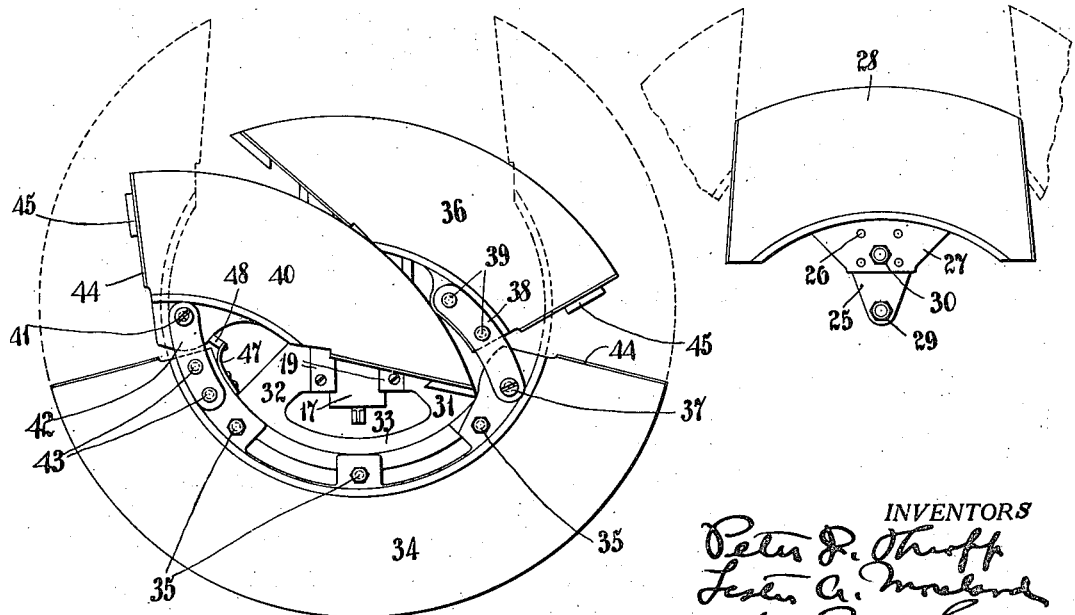
Fig.6.
Fig.7.
INVENTORS
Peter D. Thropp
Lester A. Moreland
by Bros Serrard
ATTORNEYS Oct. 5, 1926.

P. D. THROPP ET AL 1,602,132

COLLAPSIBLE CORE AND CHUCK

Filed July 29, 1922    2 Sheets-Sheet 2

INVENTORS
Peter R. Thropp
Lester A. Moreland
by Bros & Seward
ATTORNEYS

Patented Oct. 5, 1926.

1,602,132

UNITED STATES PATENT OFFICE.

PETER D. THROPP AND LESTER A. MORELAND, OF TRENTON, NEW JERSEY, ASSIGNORS TO THE DE LASKI & THROPP CIRCULAR WOVEN TIRE COMPANY, OF TRENTON, NEW JERSEY, A CORPORATION OF NEW JERSEY.

COLLAPSIBLE CORE AND CHUCK.

Application filed July 29, 1922. Serial No. 578,514.

This invention relates to an improvement in collapsible cores and chucks therefor, designed to be used in the manufacture of tires. The device is particularly applicable to employment in connection with the manufacture of cord tires, or fabric tires having inextensible beads or edges.

An object of the invention consists in providing such a device in which one of the segments may be mechanically drawn inwardly in a radial direction and entirely removed from connection with the other members, so as to permit a very compact collapsing of the last named members in order to facilitate the removal of the tire for vulcanization. It has been found that, in the case of many cores in which the several segments or members bear a hinged relation to each other, it is practically impossible to collapse the members for the removal of the tire, particularly in those sizes where the cross section of the core is relatively large with respect to the diameter. Our invention overcomes this drawback.

Another object consists in providing such an apparatus in which the members of the core are laterally offset from the chuck to such an extent as readily to permit the collapsing of the members by simple movements in the plane of the core; thereby obviating any complications entailed in providing for an angular movement of one or more of the members with respect to the core plane.

Another object consists in providing such a device in which the core and chuck may quickly be removed from the support such, for instance, as the drive shaft of a tire making machine, and placed upon a hand building stand or buck for the performance of any hand labor which may be desired in the completion of the tire.

A further object consists in providing certain improvements in the form, construction and arrangement of the several parts whereby the above named and other objects may be effectively attained.

A practical embodiment of the invention is represented in the accompanying drawings, in which—

Fig. 1 represents a face view of the core and chuck, partly broken away.

Fig. 6 represents a face view, with one segment removed, and two other segments shown in expanded and collapsed positions in dotted and full lines respectively.

Fig. 7 represents a detail view illustrating, in dotted and full lines, the radial movement of the removable segment.

The spindle or drive shaft of a tire making machine is represented by 1, and it has a flanged collar 2 which is fixed thereon by a key 3 and a round nut 4.

Figure 2:
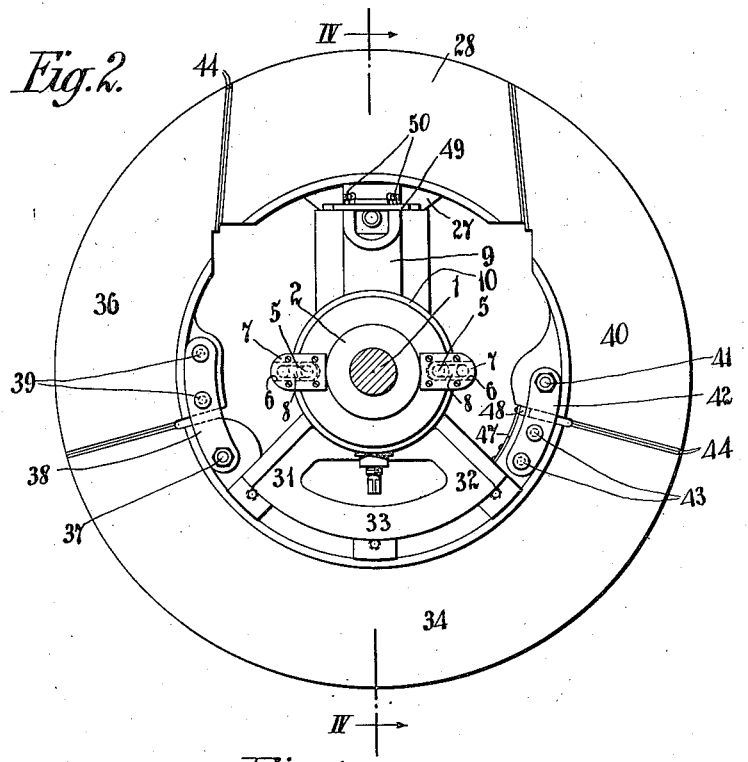
Fig. 2 represents a rear view of the same.
Figure 3:
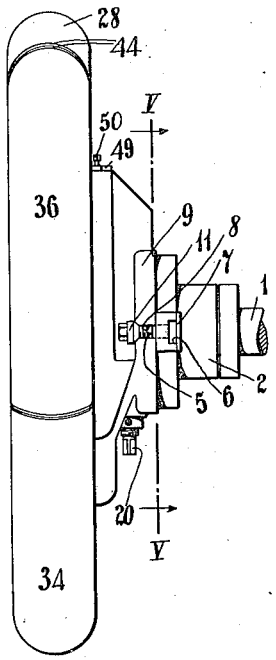
Fig. 3 represents an edge view of the same.

The flange of the collar 2 has a pair of stud bolts 5 slidably carried in under-cut grooves 6 formed therein, plates 7 being screwed to the under face of the flange for the purpose of preventing the bolts from slipping out of position. The shanks of these bolts 5 are designed to enter slots 8 which are formed in the edge of a plate 9, that constitutes the center of the chuck. The said plate has an annular rib 10 formed thereon of such size as to embrace, with a free fit, the periphery of the flange on the collar 2, while nuts 11, threaded on the bolts 5, may be tightened down in order to firmly clamp the plate on the flange of the collar 2. In this assembly the round nut 4 serves to center the plate 9 on the spindle 1. By reference to Fig. 3, it will be observed that the nuts 11 are tapered to seat in correspondingly shaped recesses in the plate 9, in order better to secure the parts against any relative movement with respect to each other.

The plate 9 has a bearing 12 formed on one side in which is rotatably mounted one end of a screw 13. A collar 14 formed on the said screw and a second collar 15 removably secured thereto, serve to clamp the screw 13 against longitudinal movement in the bearing 12. The other end of the screw 14 is threaded into a block 16 which, in turn, is fast to a slide 17 that is mounted for reciprocation in grooves 18 formed in the sides of the plate 9. A pair of gibs 19 are screwed to the plate 9 for the purpose of holding the slide 17 in position therein. An end of the screw 13 which protrudes beyond the bearing 12 is squared, as indicated at 20, for the reception of a socket wrench in order to adapt it for manual operation.

From the immediately foregoing description, it will be seen that operation of the screw 13 by a socket wrench, or other suitable device, will move the block 16, and hence, the slide 17, in one direction or the other in the plate 9.

Figure 4:
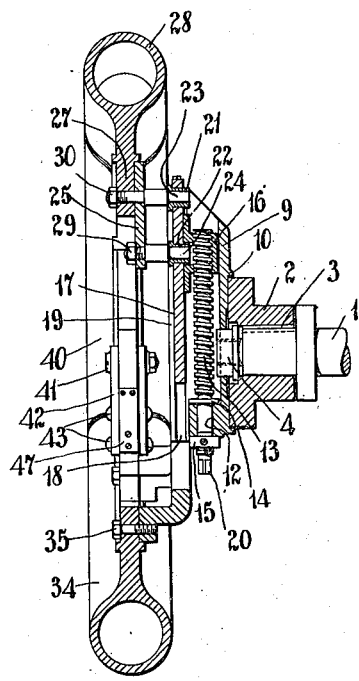
Fig. 4 represents a section taken in the plane of the line IV—IV of Fig. 2, looking in the direction of the arrows.
Figure 5:
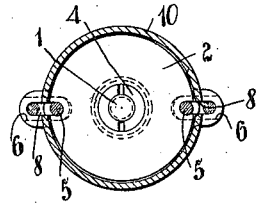
Fig. 5 represents a section taken in the plane of the line V—V of Fig. 3, looking in the direction of the arrows.

A pair of bushings 21, 22 are tightly fitted in holes formed in the slide 17, and are adapted to receive the reduced ends of dowels 23, 24. Dowel 24 has its other end reduced and fitted in an aperture formed in the end of an ear 25 which is secured, by means of rivets 26, to a flange 27 formed on a core segment 28. The said end of the dowel 24 is threaded for the reception of a nut 29 in order to clamp it firmly in engagement with the ear 25. The dowel 23 has one end similarly reduced and passed through apertures in both the ear 25 and flange 27, and it is also threaded for the reception of a nut 30 to secure it firmly in connection with the said parts. The fact that both ends of both dowels are reduced, serves to provide shoulders which bear upon the bushings 21, 22 and the ear 25, so as to hold the core segment 28 in a predetermined spaced relation from the slide 17, as clearly shown in Fig. 4.

This construction provides means for removably connecting the core segment 28 to the slide 17, since the dowels 23, 24 are always fixed to the said segment, and it is only necessary to enter their free ends into the bushings 21, 22 in order to establish the connection just mentioned. When the said parts are connected, rotation of the screw 13 will, of course, serve to slide the segment 28 inwardly or outwardly in a radial direction, as the case may be.

The chuck plate 9 has a pair of arms 31, 32 formed integrally therewith, which arms have their extremities bent at right angles to the remainder (see Fig. 4) and connected by an arc piece 33. The bend at the ends of the arms 31, 32 causes the arc piece 33 to be offset from the plate 9 into the plane of the ear 25 that is connected to the segment 28. These parts 31, 32, 33 serve as a support for a large fixed core segment 34 that is secured thereto by bolts 35.

Another core segment 36 is hinged to the segment 34, as indicated at 37, by means of a tongue 38 which is fastened to the segment 36 by rivets 39.

A fourth segment 40, which is very similar to the segment 36, is hinged, as shown at 41, to a tongue 42 that is fixed to the segment 34 by rivets 43.

The abutting faces of all the core segments are preferably provided with steel face plates and, as these are somewhat conventional, they are generally denoted by 44. The face plates between the ends of the segment 34 and the segments 36 and 40 are provided with tongue and groove engagements, represented at 45, which are shaped so as to interlock upon the swinging of the segments 36 and 40 into abutting engagement with the segment 34, while the face plates intermediate the abutting ends of the segment 28 and the segments 36 and 40 are provided with interlocking portions, denoted at 46, which take effect upon the outward sliding movement of the segment 28 with respect to the others. In order to hold the segment 40 in its expanded position (shown in dotted lines, Fig. 6) while the segment 36 is being swung to its expanded position and the segment 28 put in place, we provide a leaf-spring 47 which is fastened to the segment 34 and carries a lug 48 which is fitted to enter between the inner portions of the abutting ends of segments 34 and 40. The lug will be yieldingly held in this locking position and may be manually released when it is desired to collapse the core. There is also provided a stop 49 which is secured to the plate 9 in the line of movement of the slide 17. This stop carries adjustable screws 50 which are designed to contact with and limit the outward radial movement of the said slide and hence, of the segment 28.

In operation; assuming the parts to be in the condition indicated in Fig. 1, and a tire to have been built upon the core, the screw 13 is actuated by a socket wrench, or the like, so as to draw the segment 28 inwardly in a radial direction. When this segment has come inwardly far enough so as to disengage the locking portions 46 and to substantially clear the inner edge of the tire, it is bodily removed from the remainder of the apparatus by simply pulling it laterally and thereby disengaging the dowels 23, 24 from the bushings 21, 22. This inward movement is represented in Fig. 7.

Following the removal of the segment 28, the segments 36 and 40 are swung about their hinges 37 and 41 so as to collapse them, as represented in full lines in Fig. 6.

These steps serve to so greatly reduce the size of the outer circumference of the core, that the tire may readily be slipped therefrom and passed on to the remaining processes. As already indicated, it will be observed that the arrangement is such that all the segments of the core are offset laterally into a plane far enough away from the plane of the outer face of the chuck plate 9, that the collapsing of the core may take place without movement of the members angularly with respect to the plane of the core.

When it is desired to reestablish the core in operative assembly for the purpose of building a tire thereon, it is only necessary to reverse the operations just described.

In cases where hand operations are to be performed upon the tire subsequent to the action of the tire making machine, and it is deemed best to support the tire on a hand making stand or buck for these operations, it is only necessary to loosen the nuts 11 on the bolts 5, and slide the latter outwardly in the grooves 6 so as to cause them to clear the plate 9. This permits the core and chuck, as a unit, to be separated from the collar 2 on the tire making machine shaft; whereupon the core and chuck may be similarly mounted upon a hand making stand or buck, which latter is preferably provided with a collar and bolts, similar to the parts 2 and 5 herein described.

We desire it to be understood that various changes may be resorted to in the form, construction and arrangement of the several parts, without departing from the spirit and scope of our invention; and that we do not intend to be limited to the details herein shown and described except as they may be set forth in the claims.

What we claim is:

1. A device of the character described comprising, a core including a main segment, a plurality of hinged segments and a separate slidable segment, a rotatable chuck for supporting the segments, mechanism on the chuck for sliding the separate segment radially, said segment being offset from its slidable mounting and its moving mechanism, and being arranged and required to be removed in a lateral direction away from its support and radial moving mechanism in order to permit the hinged segments to collapse.

2. A device of the character described comprising, a core including a main segment, a plurality of hinged segments and a separate slidable segment, a rotatable chuck for supporting the segments, mechanism on the chuck for sliding the separate segment radially, said segment being offset from its slidable mounting by means of a dowel projecting laterally away from the plane of the core for removably holding the separate segment in engagement with its support and moving mechanism, said main segment and hinged segments being similarly offset from the plane of the chuck by means of a plurality of arms on the chuck having their ends bent at an angle to such plane, said separate segment being arranged and required to be removed in a lateral direction away from its support and radial moving mechanism in order to permit the hinged segments to collapse.

In testimony, that we claim the foregoing as our joint invention, we have signed our names this 25th day of July 1922.

PETER D. THROPP.
LESTER A. MORELAND.